(12) United States Patent
Shin et al.

(10) Patent No.: US 10,044,393 B2
(45) Date of Patent: Aug. 7, 2018

(54) WATCH TYPE MOBILE TERMINAL

(71) Applicant: LG ELECTRONICS INC., Seoul (KR)

(72) Inventors: Choonghwan Shin, Seoul (KR); Byunghwa Lee, Seoul (KR); Dongwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/554,521

(22) PCT Filed: Mar. 12, 2015

(86) PCT No.: PCT/KR2015/002390
§ 371 (c)(1),
(2) Date: Aug. 30, 2017

(87) PCT Pub. No.: WO2016/143926
PCT Pub. Date: Sep. 15, 2016

(65) Prior Publication Data
US 2018/0048341 A1    Feb. 15, 2018

(30) Foreign Application Priority Data

Mar. 10, 2015  (KR) .................. 10-2015-0033021

(51) Int. Cl.
*H04B 1/38*   (2015.01)
*H04B 1/3827* (2015.01)
(Continued)

(52) U.S. Cl.
CPC ........... *H04B 1/385* (2013.01); *A44C 5/0053* (2013.01); *G04G 17/06* (2013.01); *G04G 19/10* (2013.01); *G04G 21/06* (2013.01); *H04B 1/3883* (2013.01)

(58) Field of Classification Search
CPC .... H04B 1/3827; H04B 1/385; H04B 1/3883; H04B 2001/3861; A44C 5/0053; G04G 17/06; G04G 19/10; G04G 21/06
(Continued)

(56) References Cited

U.S. PATENT DOCUMENTS 7,251,197 B2 *  7/2007  Yoshida ................. G04G 21/04
                                                     455/90.3
8,773,847 B2 *  7/2014  Byun ..................... H04B 1/385
                                                    361/679.03
(Continued)

FOREIGN PATENT DOCUMENTS

JP      2001-103536 A    4/2001
KR  10-1999-0046393 A    7/1999
(Continued)

*Primary Examiner* — Quochien B Vuong
(74) *Attorney, Agent, or Firm* — Birch, Stewart, Kolasch & Birch, LLP (57) ABSTRACT

The present invention provides a watch type mobile terminal which comprises: a body; a first wireless communication unit installed in the body; a band connected to the body and wound on a user's wrist; a first battery installed in the body or the band; a wireless audio module mounting unit formed on the band and having a concave shape; and a wireless audio module which can be attached to or detached from the wireless audio module amounting unit, wherein the wireless audio module comprises: a housing; an audio output unit installed in the housing; a second wireless communication unit installed in the housing; and a second battery installed in the housing and receiving power supplied from the first battery.

11 Claims, 8 Drawing Sheets

(51) Int. Cl.
| | |
|---|---|
| *H04B 1/3883* | (2015.01) |
| *G04G 19/10* | (2006.01) |
| *G04G 21/06* | (2010.01) |
| *G04G 17/06* | (2006.01) |
| *A44C 5/00* | (2006.01) |

(58) Field of Classification Search
USPC .................. 455/41.1, 41.2, 90.3, 556.1, 557
See application file for complete search history.

(56) References Cited

U.S. PATENT DOCUMENTS

| | | | |
|---|---|---|---|
| 9,288,301 B2 * | 3/2016 | Chung | ............... G06F 1/163 |
| 9,497,307 B2 * | 11/2016 | Jiang | ................. H04B 5/00 |
| 2008/0043575 A1 | 2/2008 | Fasciano | |
| 2014/0344896 A1 * | 11/2014 | Pak | .................. G06F 21/74 |
| | | | 726/4 |

FOREIGN PATENT DOCUMENTS

| | | | |
|---|---|---|---|
| KR | 10-2008-0093178 A | 10/2008 |
| KR | 10-2010-0050028 A | 5/2010 |
| KR | 10-2011-0008607 A | 1/2011 |
| KR | 10-2011-0066741 A | 6/2011 |

* cited by examiner

WATCH TYPE MOBILE TERMINAL

CROSS REFERENCE TO RELATED APPLICATIONS

This application is the National Phase of PCT International Application No. PCT/KR2015/002390, filed on Mar. 12, 2015, which claims priority under 35 U.S.C. 119(a) to Patent Application No. 10-2015-0033021, filed in Mar. 10, 2015 on Republic of Korea, all of which are hereby expressly incorporated by reference into the present application.

FIELD

Embodiments of the present disclosure relate to a watch type mobile terminal including a sound output module which is usable after detached from a body.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Moreover, diverse designs are applied to the mobile terminal to express personality, as the mobile terminal is provided as personal belonging. The conventional mobile terminal is held in the user's hand or kept in a pocket or bag to be carried. In this instance, the mobile terminal is likely to be lost or damaged by falling while hand-carried and there is discomfort in carrying the conventional mobile terminal.

To solve such disadvantages, diverse types of wearable mobile terminals are released. A user is able to wear such a wearable mobile terminal on the wrist like a watch or on the neck like a necklace or on the waist. The size and functions may be variable according to wear types.

A watch type mobile terminal is worn on a user's wrist and then has a convenience of hand-carrying. However, the watch type mobile terminal has to use a speaker mode or an auxiliary earphone has to be connected to make or answer a call or listen to music inconveniently.

DETAILED DESCRIPTION OF INVENTION

Technical Problem

Accordingly, an object of the present disclosure is to provide a watch type mobile terminal of which a sound output module is used in making or answer a call or listening to music as an earphone after detached from a body.

Technical Solution

Embodiments of the present disclosure may provide a watch type mobile terminal comprising a body; a first wireless communication unit loaded in the body; a band connected with the body and wound around a user's wrist; a first battery loaded in the body or the band; a wireless sound module seating unit formed in a concave shape; and a wireless sound module detachable from the wireless sound module seating unit, wherein the wireless sound module comprises a housing; a sound output unit loaded in the housing; a second wireless communication unit loaded in the housing; and a second battery loaded in the housing and supplied power by the first battery.

The band may comprise a flexible material, and the first battery may be made of a flexible material and loaded in the band.

The first battery may be loaded in the band, and the band may be detachable from the body.

The watch type mobile terminal may further comprise a band coupling portion disposed between the band and the body, wherein the band coupling portion comprises a connecting projection inserted in a connecting groove formed in the body; a hinge configured to be coupled to the band; and a flexible printed circuit board configured to connect the connecting projection and the first battery with each other.

The housing may comprise a first surface toward the wireless sound module seating unit and a second surface exposed to an outer surface of the band; a sound output projection projected from the first surface; and a sound hole formed in the sound output projection.

The wireless sound module seating unit may comprise a through-hole corresponding to the sound output projection.

The watch type mobile terminal may further comprise a power terminal formed in the wireless sound module seating unit; and a charge terminal configured to contact with the power terminal when the wireless sound module is inserted in the wireless sound module seating unit.

The band may be made of an elastic member which is deformable in shapes, and an entrance of the wireless sound module seating unit may be narrower than an inner portion of the wireless sound module seating unit.

The watch type mobile terminal may further comprise a nail-caught groove formed in the housing, corresponding to a detaching groove, wherein the detaching groove is cut away from the entrance of the wireless sound module seating unit to an inner wall of the wireless sound module seating unit.

The watch type mobile terminal may further comprise an inclined surface inclined from the entrance of the wireless sound module seating unit to the inner wall of the wireless sound module seating unit; and an inclined surface provided in a rim of the second surface exposed outside the housing.

The watch type mobile terminal may further comprise a spring loaded in a bottom surface of the wireless sound module seating unit.

Advantageous Effects

The watch type mobile terminal in accordance with the present disclosure has following effects. According to at least one embodiment mentioned above, the watch type mobile terminal is capable of minimizing the consumed power when the display unit is partially activated. Accordingly, the watch type mobile terminal may increase houses of battery use.

The LED for a second region where an image is output independently is located in a dent in the watch type mobile terminal. Accordingly, the size of the terminal may be prevented from being enlarged in a lateral direction.

Furthermore, needed information may be gained quickly from the second region which is consistently activated. The user needs not effort to activate the display unit so as to check presence of new events and use convenience can be enhanced accordingly.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
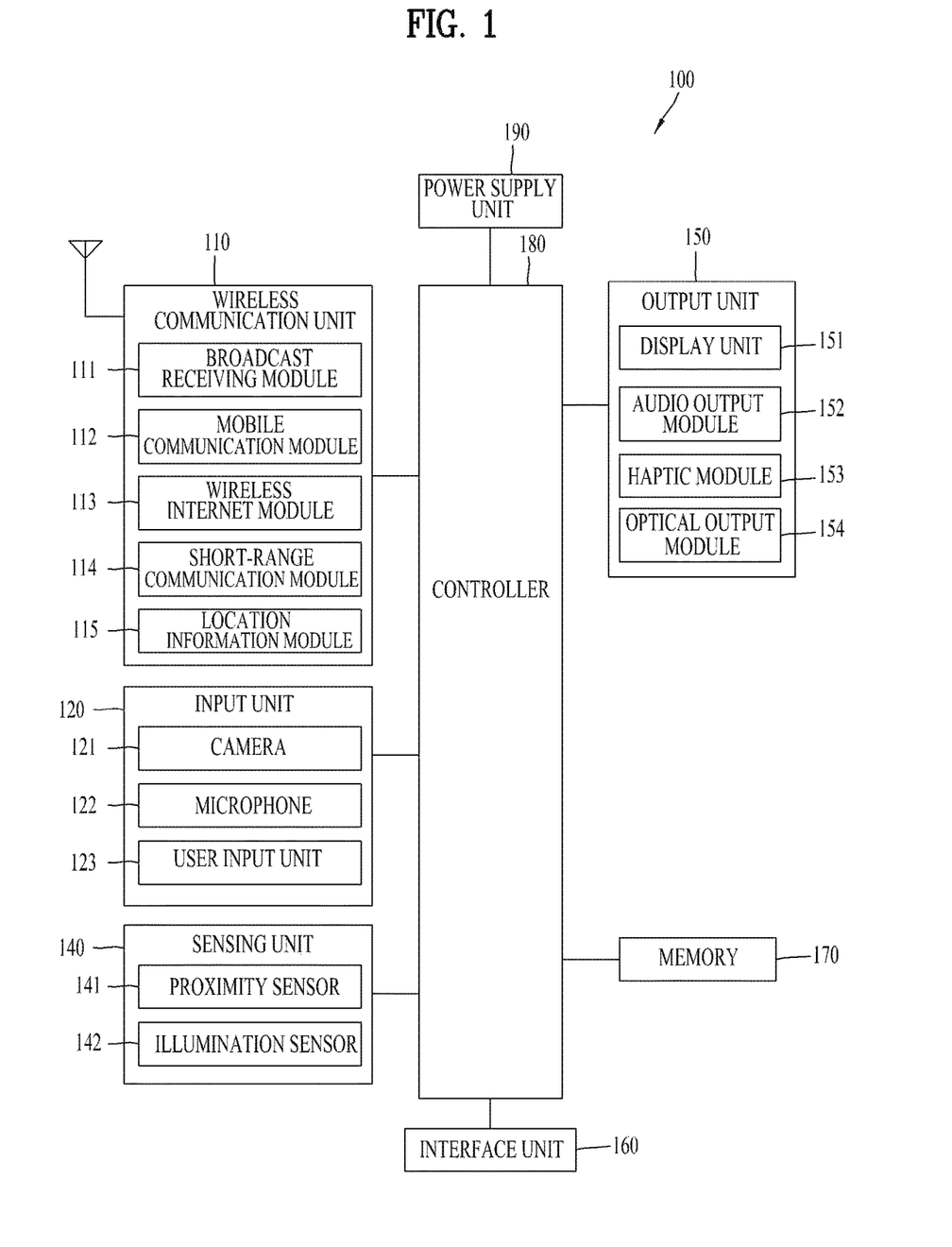
FIG. 1 is a block diagram to describe a watch type mobile terminal in accordance with the present disclosure.

FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Meanwhile, the mobile terminal is able to be expanded to be a wearable device which is wearable on a user's body part, beyond the hand-carrying type which is held in the hand. Examples of such a wearable device include a smart watch, smart glasses, HMD (Head Mounted Display) and the like. Hereinafter, examples of the mobile terminal expanded as the wearable devices will be described.

Figure 2:
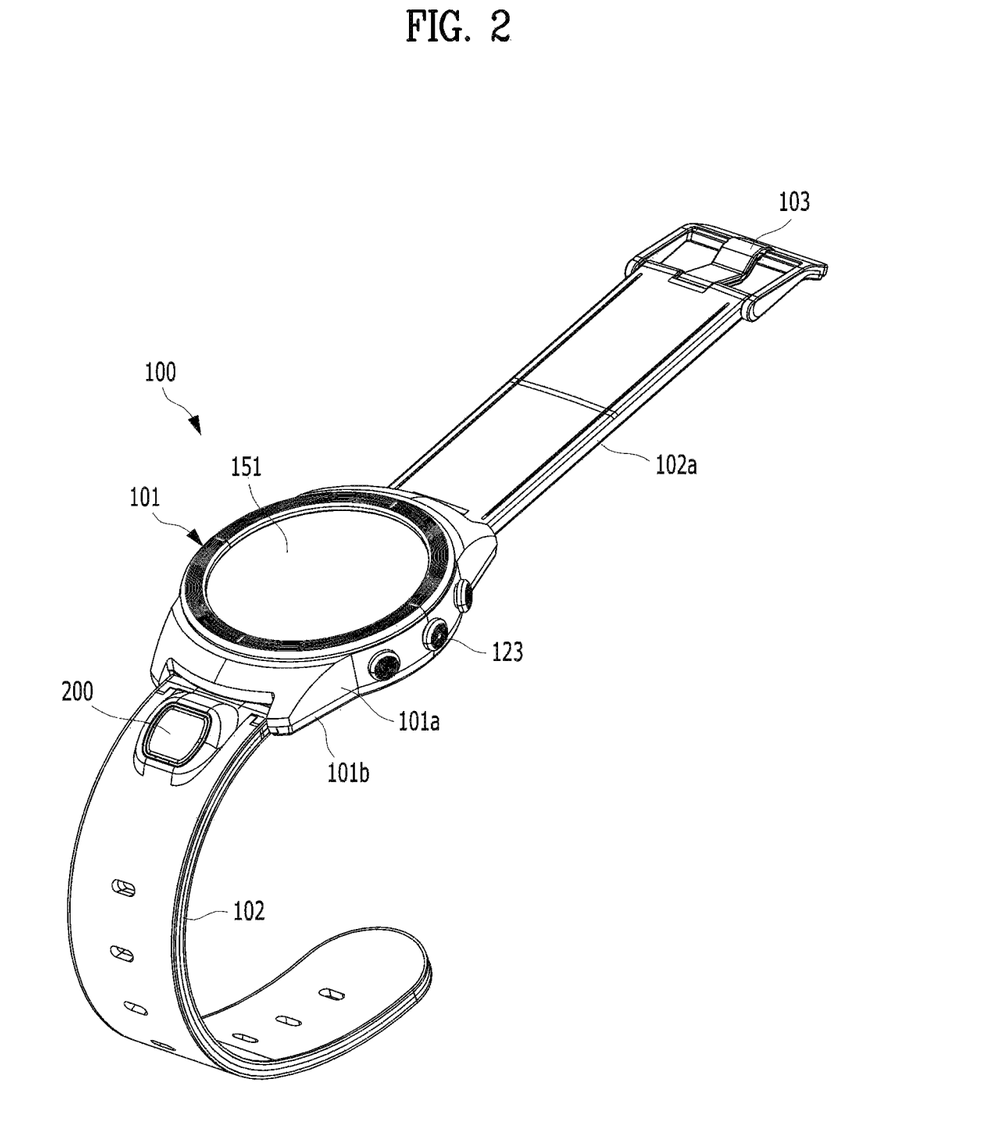
FIG. 2 is a perspective diagram illustrating one example of a watch type mobile terminal in accordance with one exemplary embodiment of the present disclosure, viewed from one direction.

FIG. 2 is a perspective diagram illustrating one example of the watch type mobile terminal in accordance with one embodiment of the present disclosure.

Referring to FIG. 2, the watch type mobile terminal 100 includes a body 101 having a display unit 151; and a band 102 connected to the body 101 to be wearable on the user's wrist.

The body 101 includes a case for defining an exterior design. As shown in the drawing, the case includes a first case 101a and a second case 101b which define an internal space to load diverse electronic components therein. The present disclosure is not limited thereto and one case may be configured to define the internal space to realize the unibody mobile terminal 100.

The watch type mobile terminal 100 is able to perform wireless communication and an antenna for the wireless communication may be loaded in the body 101. Functions of the antenna may be expanded by using the case. For example, the case including a conductive material is electrically connected with the antenna to expand the ground or radiation region.

A display 151 is arranged on a front surface of the body 101 and configured to output information. A touch sensor may be provided in the display unit 151 to realize a touch screen display unit 151. As shown in the drawing, a window 151*a* of the display unit 151 is disposed in the first case 101*a* so as to define a front surface of the terminal body, together with the first case 101*a*.

In the body 101 may be a sound output unit 152, a camera 121, a microphone 122, a user input unit 123 and the like. In this instance, the display unit 151 realized as the touch screen may function as the user input unit 123 and auxiliary keys need not be provided in the body 101 accordingly The band 102 is wearable on the user's wrist to wrap around the wrist. The band 102 may be made of a flexible material to facilitate the wearing. For example, the band 102 may be made of leather, rubber, silicon, synthetic resin or the like. The band 102 may be detachable from the case 101, so that it can be replaced by diverse types of bands according to the user's taste.

Meanwhile, the band 102 may be used in expanding the functions of the antenna. For example, a ground expanding unit (not shown) electrically connected with the antenna may be embedded in the band to expand the ground region.

The band 102 may include a fastener 102*a*. The fastener 102*a* may be realized in a hook structure which facilitates a buckle and snap-fit or a Velcro (Brand name) structure. The band also includes a flexible section or material. In the drawing, the fastener 102*a* is realized as the buckle type.

The watch type mobile terminal 100 in accordance with the present disclosure is characterized in that the sound output unit 152 is detachable. The sound output unit 152 is embedded in the wireless sound module 200 and the wireless sound module 200 has a second wireless communication unit which is embedded therein and configured to transceive a wireless signal with the first wireless communication unit embedded in the terminal body 101 or the band 102 of the watch type mobile terminal.

Hereinafter, the structure and the coupling structure of the wireless sound module 200 will be described in detail, referring to FIGS. 3 through 10.

Figure 3:
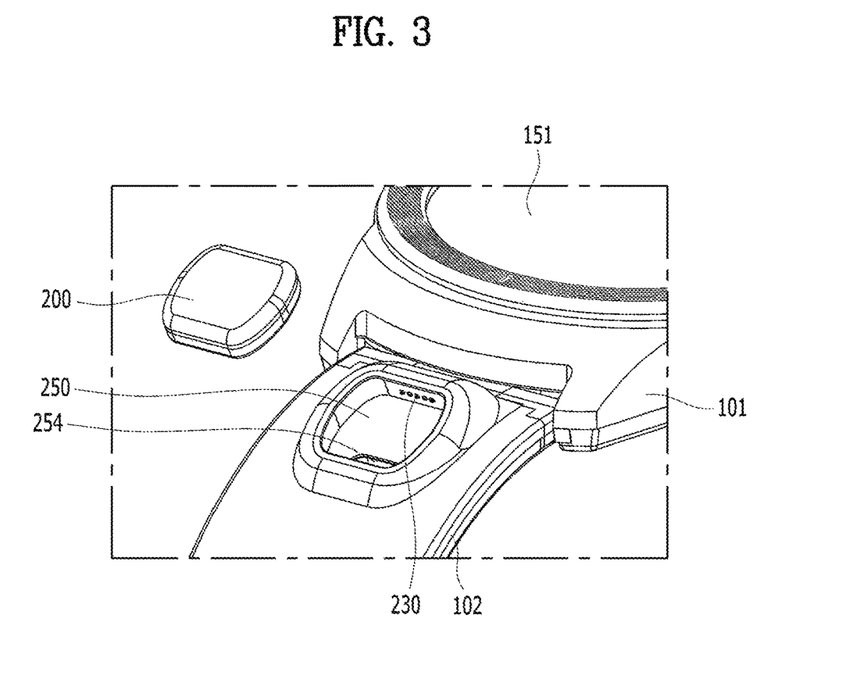
FIG. 3 is a perspective diagram illustrating a state of a wireless sound module which is separated from one embodiment of the watch type mobile terminal.
Figure 4:
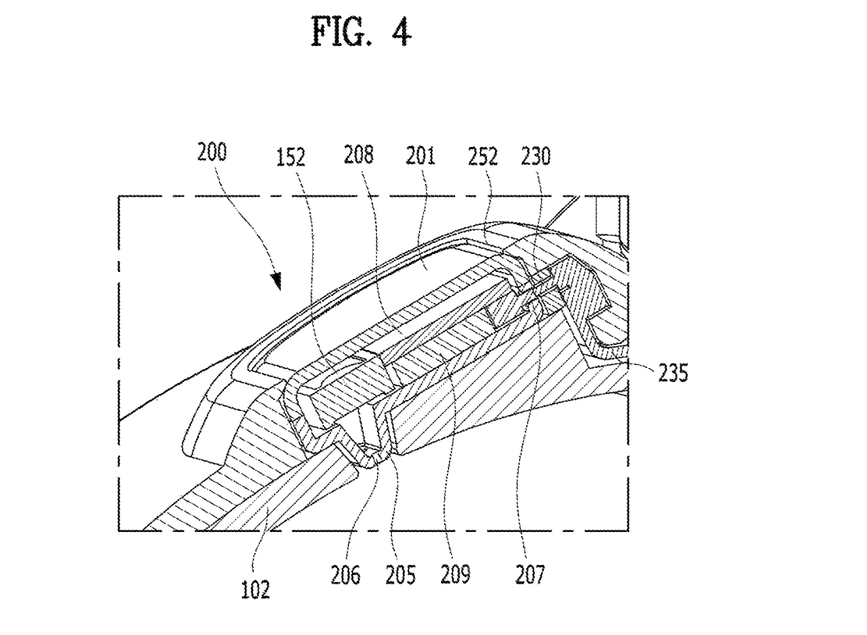
FIG. 4 is a sectional diagram illustrating the wireless sound module and a wireless sound module seating unit which are provided in one embodiment of the watch type mobile terminal.

FIG. 3 is a perspective diagram illustrating a state of the wireless sound module 200 which is detached from one embodiment of the watch type mobile terminal. FIG. 4 is a sectional diagram illustrating the wireless sound module 200 and a wireless sound module seating unit 250 which are provided in one embodiment of the watch type mobile terminal. The wireless sound module seating unit 250 formed in the band 102 is concavely recessed from the band 102 and has a bottom surface and a lateral surface which support the wireless sound module 200. Considering the wireless sound module 200, the region of the band 102 where the wireless sound module 250 is provided may be formed thick as shown FIGS. 3 and 4.

Using the shape of the band 102 of which the thickness gets decreased at the terminal case 101, the wireless sound module seating unit 250 may be provided in a region where the band 102 is connected with the case 102.

An entrance of the wireless sound module seating unit 250 is formed narrower than an inner portion of the wireless sound module 200, to secure the wireless sound module 200. The wireless sound module seating unit 250 includes a projection 252 projected from the entrance and the projection 252 is fixedly secure the wireless sound module 200 not to separate therefrom. When the band 102 is made of an elastic material such as silicon, the user presses the wireless sound module seating unit 250 with the wireless sound module 200 and the projection 252 is then deformed to insert the wireless sound module 200 in the wireless sound module seating unit 250.

The wireless sound module 200 includes a housing 201 for mounting electronic components therein; a printed circuit board 208 on which the second wireless communication unit mounted in the housing 201 is printed; a sound output unit 152; and a second battery 209. The housing 201 is formed in a shape corresponding to the seating unit and has a sound output projection 205 projected from one end.

The sound output projection 205 is configured to resonate and amplify the sound output from the sound output unit 152 and formed in a corresponding shape to the user's ear to be stably inserted in the user's ear. The sound output unit 152 may be located in the sound output projection 205 and a sound hole 206 may be formed in one end of the sound output projection 205.

The surface of the wireless sound module 200 which contacts with the wireless sound module seating unit 250 may be a first surface and another surface which is exposed outside may be a second surface. In this instance, the projected sound output projection 205 may be formed in the first surface. An inclined surface and a through-hole 254 may be formed in the bottom surface of the wireless sound module seating unit 250, corresponding to the shape of the sound output projection 205.

The sound output projection 205 formed in the second surface might be exposed outside and caught in use, only to make the user feel uncomfortable. In addition, the exposed sound output projection formed in the second surface looks not so good. Accordingly, the sound output projection may be formed in the first surface of the housing 201. The through hole 254 is formed in the bottom surface of the wireless sound module seating unit 250 to design that the sound output projection 104 is located in the wireless sound module seating unit 250. When trying to use the sound output projection 205 as a speaker, the user changes its location to expose the sound hole 206 outside and then insert the sound output projection in the sound output seating unit 250.

The sound output projection 205 or the housing 201 may partially include a material with a high friction force to stably secure the wireless sound module 200 to the user's ear.

As the wireless sound module 200 is small-sized, the second battery 209 has a limited size. To overcome the size limitation of the second battery 209, the second battery 209 may be charged from the first battery 191 embedded in the terminal body 101 or the band 102 of the watch type mobile terminal. A power terminal 230 is exposed in the wireless sound module seating unit 250 and the power terminal 230 is connected with the first battery 191 via a flexible printed circuit board 235. A charge terminal 207 is exposed in the housing 2201 of the wireless sound module 200, corresponding to the power terminal 230.

A second wireless communication unit is formed on the printed circuit board 208 and the second wireless communication unit is communicable with the first wireless communication unit of the terminal body 101. Short range communication techniques configured to be implemented in a preset short range may be used as a communication method between the first wireless communication unit and the second wireless communication unit such as Bluetooth.

Figure 5:
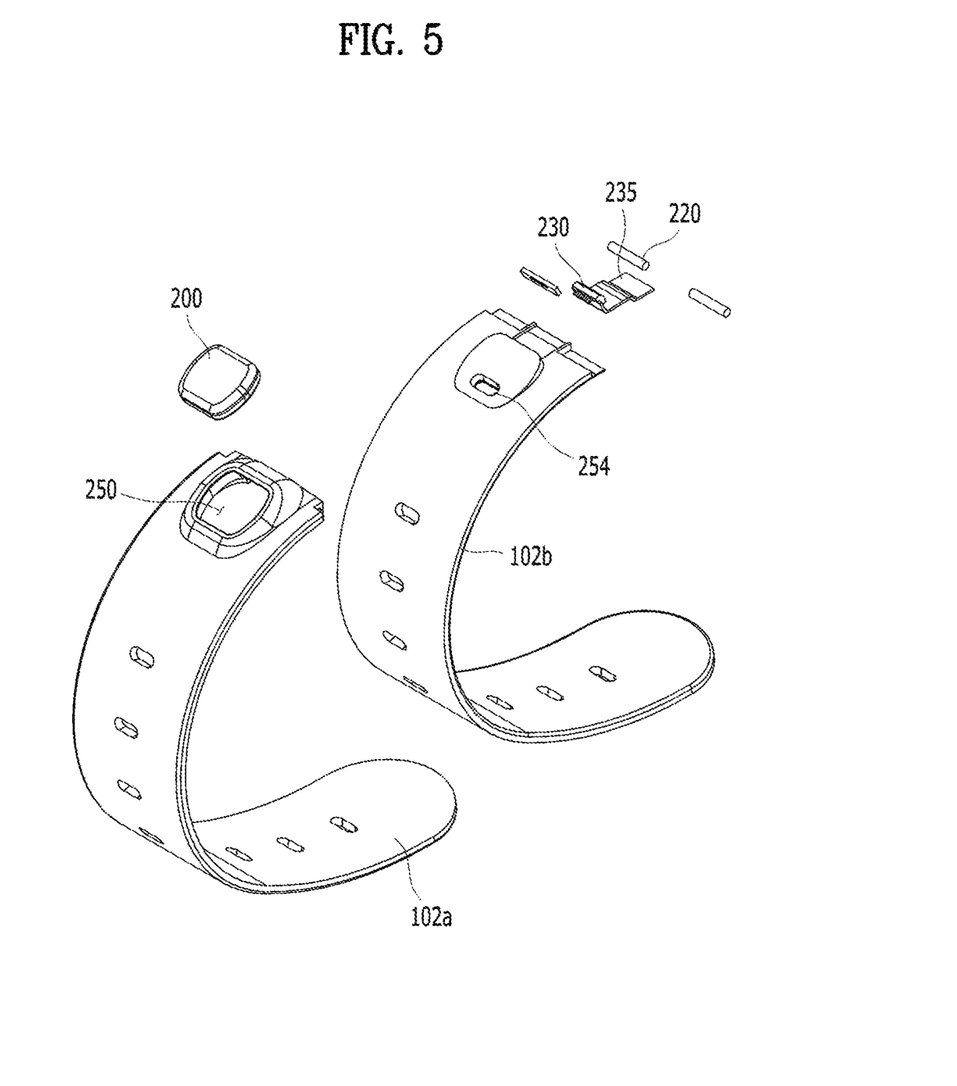
FIG. 5 is an exploded perspective diagram illustrating the wireless sound module and a band provided in one embodiment of the watch type mobile terminal.

FIG. 5 is an exploded perspective diagram illustrating the wireless sound module 20 and the band 100 provided in one embodiment of the watch type mobile terminal. The band 102 of the watch type mobile terminal may include an inner band 102*b* and an outer band 102*a*. It is preferred that the band 102 is formed by using two pieces to form the projection 252 of the wireless sound module seating unit 250. The antenna or the second battery 209 may be disposed between the inner band 102b and the outer band 102a so as to reduce the size of the terminal body 101 more.

The power terminal 230 exposed in the wireless sound module seating unit 250 is coupled by an auxiliary member and connected with the first battery 191 by using the flexible printed circuit board 235. A hinge shaft 220 may be further provided to rotatably couple the terminal body 101 to the band 102. The rotation range with respect to the hinge shaft 220 is restricted to prevent the damage on the flexible printed circuit board 235 which is generated by the too large rotation of the band.

Figure 6:
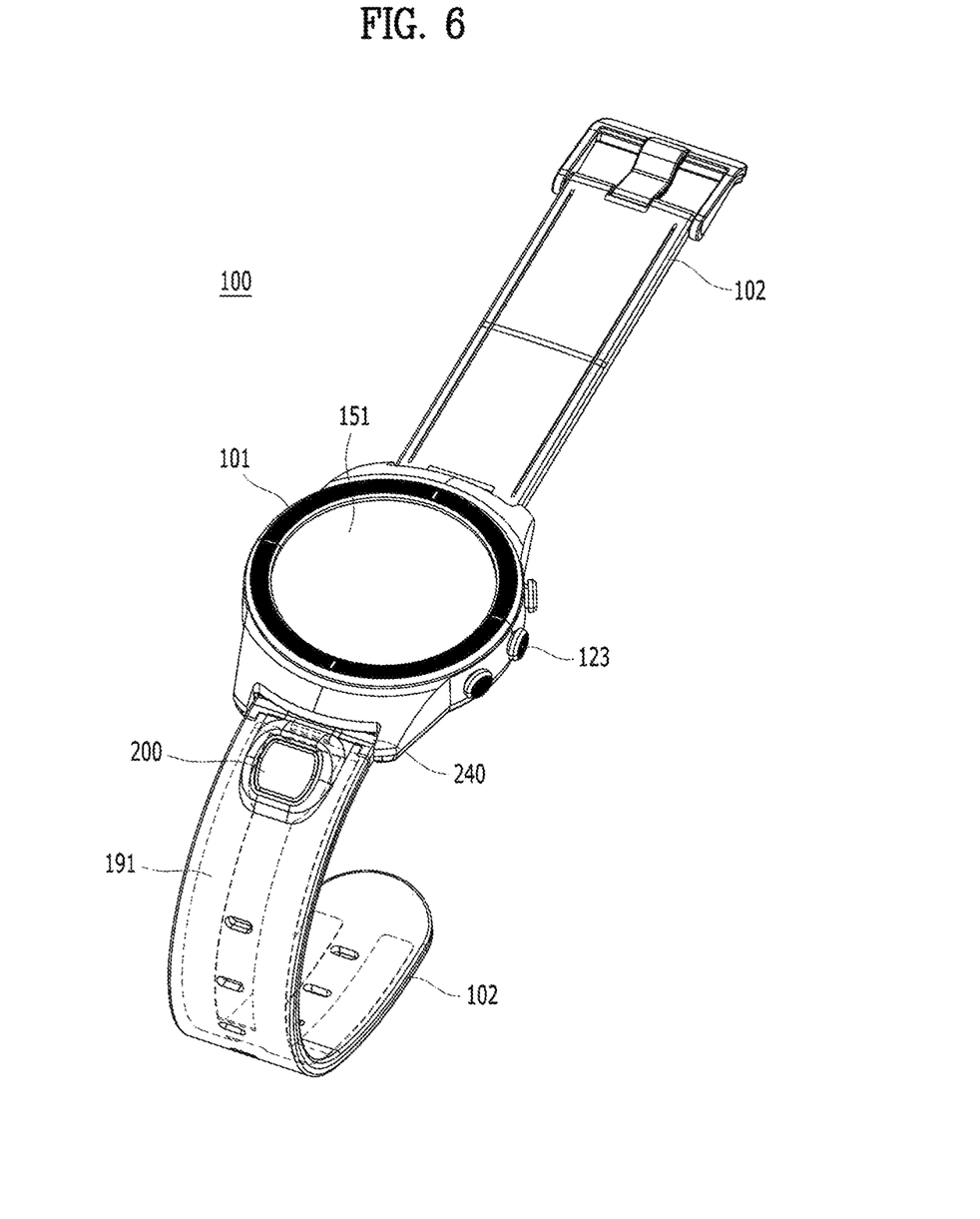
FIG. 6 is a perspective diagram illustrating another embodiment of the watch type mobile terminal.
Figure 7:
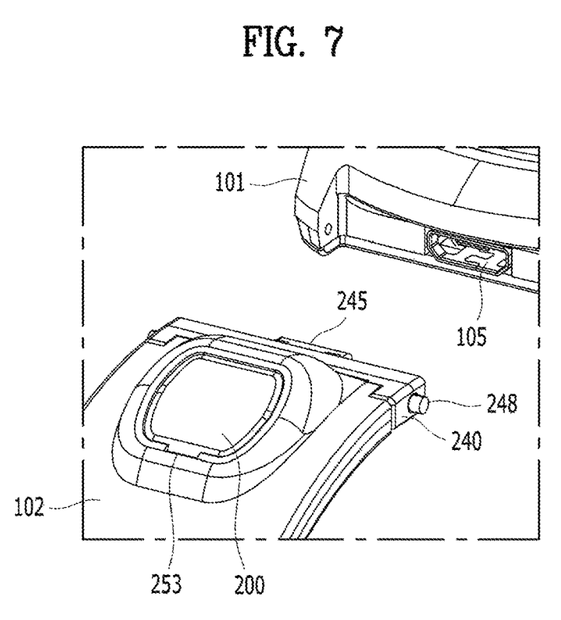
FIGS. 7 and 8 are diagrams illustrating a band provided in the embodiment of the mobile terminal shown in FIG. 6.
Figure 8:
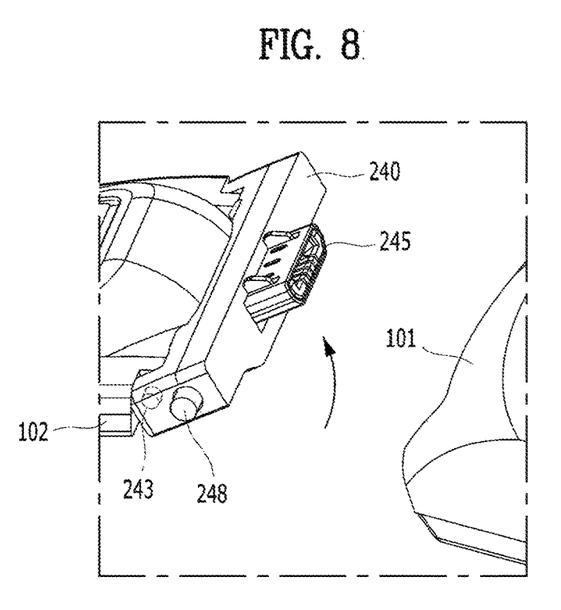

FIG. 6 is a perspective diagram illustrating another embodiment of the watch type mobile terminal. FIGS. 7 and 8 are diagrams illustrating a band 102 provided in the embodiment of the mobile terminal shown in FIG. 6.

The illustrated embodiment may further include a band coupling portion disposed between the band 102 and the terminal body 101. It is characterized in that the first battery 191 is embedded in the band 102. The first battery 191 is loaded in the band 102. The first battery 191 is loaded in the band 102 and the band 102 is detachable from the body 101 through the band coupling portion, so that the first battery 191 for supplying the power to the terminal body 101 can be replaceable.

As shown in FIGS. 7 and 8, the band coupling portion is configured to connect the body 101 and the band 102 with each other and rotatably coupled to the band 102 by a hinge 243. The region of the band coupling portion may be connected with the body 101 by using a connecting groove 105 and a connecting projection 245 for connecting the first battery 191 loaded in the band 102 with the electronic components of the body 101.

It is shown in the drawing that the connecting groove 105 is formed in the terminal body 101 and that the connecting projection 245 is formed in the band coupling portion. In contrast, the connecting groove 105 is formed in the band coupling portion and the connecting projection 245 is formed in the body 102. The hinge 248 for coupling the body 101 with the band coupling portion may be further provided but they are secured by the connecting projection 245. Accordingly, the band coupling portion and the terminal body 101 will not be rotated. Instead, as the band coupling portion and the band 102 are rotated, the connecting projection and the first battery 191 loaded in the band 102 are connected by the flexible printed circuit board 235. The connecting projection 245 and the connecting groove 105 may be charged or transceiver data by using a commonly used 5-pin terminal and a 5-pin terminal cable.

Figure 9:
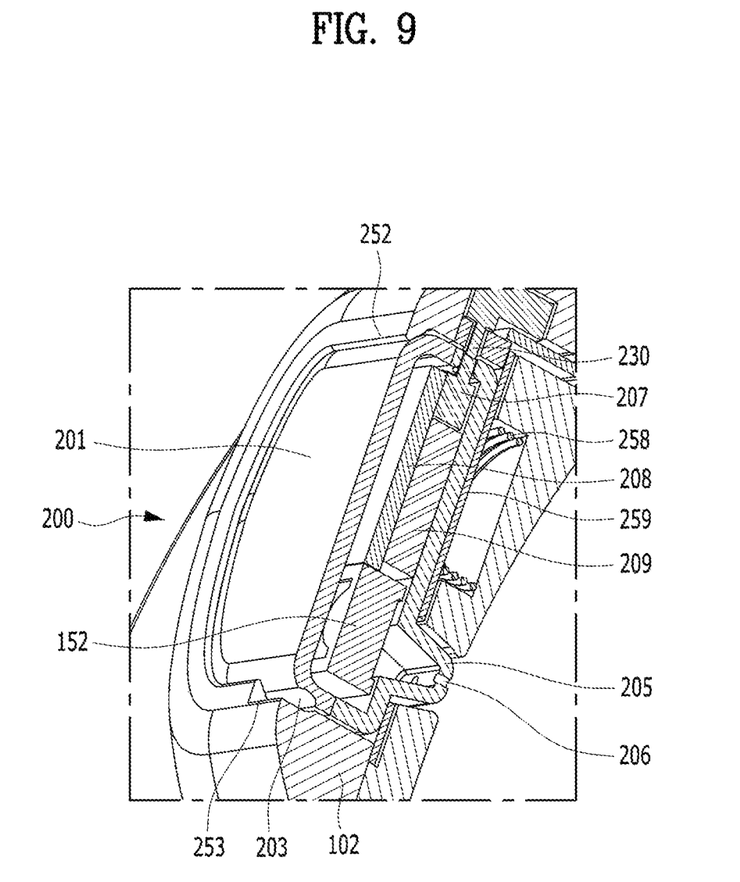
FIG. 9 is a sectional diagram illustrating a wireless sound module and a wireless sound module seating unit in accordance with a further embodiment of the watch type mobile terminal.
Figure 10:
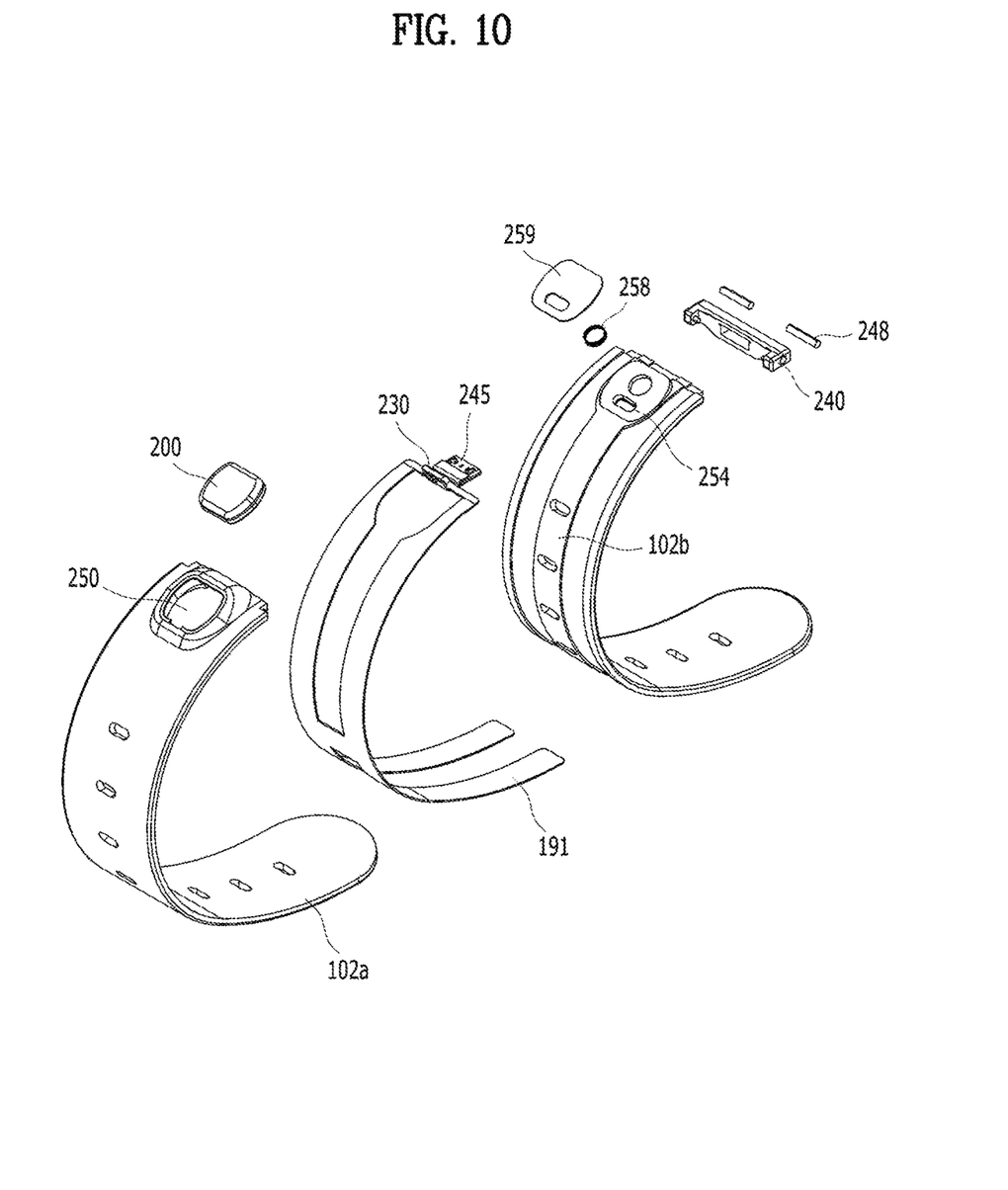
FIG. 10 is an exploded perspective diagram illustrating the wireless sound module and the band provided in the embodiment of the watch type mobile terminal.

FIG. 9 is a sectional diagram illustrating a wireless sound module 200 and a wireless sound module seating unit in accordance with a further embodiment of the watch type mobile terminal. FIG. 10 is an exploded perspective diagram illustrating the wireless sound module 200 and the band 102 provided in the embodiment of the watch type mobile terminal.

The illustrated embodiment shows that the projection formed in the entrance of the wireless sound module seating unit 250 is partially cut away to form a detaching groove 253 shown in FIG. 7 or a nail-caught groove 203 in the wireless sound module 200, corresponding to the detaching groove 253. The user is able to detach the wireless sound module 200 from the wireless sound module seating unit 250 by inserting the fingernail in the nail-caught groove 203.

A spring 258 may be provided in the bottom surface of the wireless sound module seating unit 250 to facilitate the user's detaching of the wireless sound module from the wireless sound module seating unit 250 easily when the user applies a force to the nail-caught groove 203. When the user partially detaches the wireless sound module 200 from the wireless sound module seating unit after applying a force to the nail-caught groove 203, the supporting force of the projection 252 projected from the entrance of the wireless sound module seating unit 250 becomes smaller than the restoring force of the spring 258. At this time, the wireless sound module 200 can be automatically detached by the restoring force of the spring 258, even without an additionally applied force. A support plate 259 may be further formed in the bottom surface of the wireless sound module seating unit 250 to cover the spring 258.

Referring to FIG. 10, the first battery 191 may be loaded between the outer band 102a and the inner band 102b. For the space in which the first battery 191 is inserted, a groove may be formed in the outer band 102a or the inner band 102b. A central region of the first battery 191 may omitted as shown in FIG. 10, to form a coupling groove for coupling the buckle of the band 102 thereto.

The first battery 191 is configured to supply power to the wireless sound module 200 and even to the terminal body 101 of the watch type mobile terminal, so that it may be connected to the power terminal 230 exposed to the wireless sound module seating unit 250 and the connecting projection 245 configured to be coupled to the body 101. A groove may be further formed in the inner band 102b and the spring 258 may be inserted in the inner band 102b. The detailed description of the structure will be described.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A watch type mobile terminal comprising:
   a body;
   a first wireless communication unit loaded in the body;
   a band connected with the body and wound around a user's wrist;
   a first battery loaded in the body or the band;
   a wireless sound module seating unit formed in a concave shape; and
   a wireless sound module detachable from the wireless sound module seating unit,
   wherein the wireless sound module comprises,
   a housing;
   a sound output unit loaded in the housing;
   a second wireless communication unit loaded in the housing; and
   a second battery loaded in the housing and supplied power by the first battery.

2. The watch type mobile terminal of claim 1, wherein the band comprises a flexible material, and
   the first battery is made of a flexible material and loaded in the band.

3. The watch type mobile terminal of claim 1, wherein the first battery is loaded in the band, and
   the band is detachable from the body.

4. The watch type mobile terminal of claim 3, further comprising:
   a band coupling portion disposed between the band and the body, wherein the band coupling portion comprises,
a connecting projection inserted in a connecting groove formed in the body;
a hinge configured to be coupled to the band; and
a flexible printed circuit board configured to connect the connecting projection and the first battery with each other.

5. The watch type mobile terminal of claim 1, wherein the housing comprises,
a first surface toward the wireless sound module seating unit and a second surface exposed to an outer surface of the band;
a sound output projection projected from the first surface; and
a sound hole formed in the sound output projection.

6. The watch type mobile terminal of claim 5, wherein the wireless sound module seating unit comprises,
a through-hole corresponding to the sound output projection.

7. The watch type mobile terminal of claim 1, further comprising:
a power terminal formed in the wireless sound module seating unit; and
a charge terminal configured to contact with the power terminal when the wireless sound module is inserted in the wireless sound module seating unit.

8. The watch type mobile terminal of claim 1, wherein the band is made of an elastic member which is deformable in shapes, and
an entrance of the wireless sound module seating unit is narrower than an inner portion of the wireless sound module seating unit.

9. The watch type mobile terminal of claim 8, further comprising:
a nail-caught groove formed in the housing, corresponding to a detaching groove,
wherein the detaching groove is cut away from the entrance of the wireless sound module seating unit to an inner wall of the wireless sound module seating unit.

10. The watch type mobile terminal of claim 8, further comprising:
an inclined surface inclined from the entrance of the wireless sound module seating unit to the inner wall of the wireless sound module seating unit; and
an inclined surface provided in a rim of the second surface exposed outside the housing.

11. The watch type mobile terminal of claim 1, further comprising:
a spring loaded in a bottom surface of the wireless sound module seating unit.

* * * * *